United States Patent [19]
Yamamoto et al.

[11] Patent Number: 6,128,751
[45] Date of Patent: *Oct. 3, 2000

[54] ELECTRONIC APPARATUS AND METHOD FOR PATCHING A FIXED INFORMATION

[75] Inventors: Iwao Yamamoto, Tokyo; Katsumi Matsuno, Kanagawa, both of Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/469,498

[22] Filed: Jun. 6, 1995

Related U.S. Application Data

[63] Continuation of application No. 08/004,932, Jan. 15, 1993, abandoned.

[30] Foreign Application Priority Data

Jan. 24, 1992 [JP] Japan ................................ P04-011206

[51] Int. Cl.[7] ...................................................... G06F 11/00
[52] U.S. Cl. ...................................................................... 714/8
[58] Field of Search ........................................ 395/575, 425, 395/725, 182.06, 182.04, 182.03, 375; 371/40.1, 67.1, 10.1, 10.2; 364/941, 941.1, 941.7, 960, 960.2, 970, 970.1, 245, 251.1, 251.3, 267, 267.91, 267.8, 245.3

[56] References Cited

U.S. PATENT DOCUMENTS

| | | | |
|---|---|---|---|
| 4,028,678 | 6/1977 | Moran | 340/172.5 |
| 4,028,679 | 6/1977 | Divine | 340/172.5 |
| 4,028,683 | 6/1977 | Divine et al. | 340/172.5 |

(List continued on next page.)

FOREIGN PATENT DOCUMENTS

| | | | |
|---|---|---|---|
| 0 263 447 A2 | 4/1988 | European Pat. Off. | G06F 9/30 |
| 0 428 005 A2 | 5/1991 | European Pat. Off. | G06F 09/26 |
| 0 458 559 A2 | 11/1991 | European Pat. Off. | G06F 11/00 |
| 62-249231 | 10/1987 | Japan | G06G 9/22 |
| 1-065633 | 3/1989 | Japan | G06G 9/22 |
| 1-099129 | 4/1989 | Japan | G06F 9/22 |
| 1-114941 | 5/1989 | Japan | G06G 9/22 |

OTHER PUBLICATIONS

H. Trinh, "Short and Long ROS Patch", Technical Disclosure Bulletin, 24: (3) 1379–1382 (Aug. 1981).

Shimada, et al., "Program Patching of a ROM", U.S. Patent Application No. 07/882,268, FWC of U.S. Patent Application No. 08/368,758 filed May 13, 1992.

IBM Technical Disclosure Bulletin, vol. 31, No. 1, Jun. 1988, pp. 294–298.

Charlie Melear: "Applications for Microcomputers with E$^2$PROM." Electro/86 and Mini/Micro Northeast 11 (1986), Conference Record, Los Angeles, CA, USA, pp. 1/9, #12/2.

IBM Technical Disclosure Bulletin, vol. 26, No. 10B, Mar. 1984, New York, USA, pp. 5606/5607, L. Weiss: "Path microcode change level check."

(List continued on next page.)

*Primary Examiner*—Albert De Cady
*Assistant Examiner*—David Ton
*Attorney, Agent, or Firm*—Limbach & Limbach L.L.P.

[57] ABSTRACT

An electronic apparatus includes a CPU, a ROM, a RAM, an input port, a data bus, an address bus, a patching portion address register and a patching interrupt vector register which are connected to the data bus. A comparator compares a coincidence of the address stored in the address register with an address on the address bus and, in response thereto, supplies an interrupt to an interrupt control portion of the CPU. The interrupt control portion of the CPU is also supplied with other interrupts, for other processing. Further, an external storage device, connected to the input port, supplies a program bug patching information to be stored into the RAM. The RAM includes a stack area in which, during interrupt processing, there are saved data written in the address register and the patching interrupt register. Thus, patching of program bugs can be carried out even during an interrupt.

1 Claim, 4 Drawing Sheets

U.S. PATENT DOCUMENTS

| | | | |
|---|---|---|---|
| 4,028,684 | 6/1977 | Divine et al. | 340/172.5 |
| 4,051,460 | 9/1977 | Yamada et al. | 364/900 |
| 4,095,278 | 6/1978 | Kihara | 364/900 |
| 4,150,428 | 4/1979 | Inrig et al. | 364/200 |
| 4,218,757 | 8/1980 | Drogichen | 364/900 |
| 4,291,375 | 9/1981 | Wolf | 364/483 |
| 4,296,470 | 10/1981 | Fairchild et al. | 364/251.1 |
| 4,319,343 | 3/1982 | Powell | 365/189 |
| 4,400,798 | 8/1983 | Francis et al. | 365/174 |
| 4,424,574 | 1/1984 | Enoki et al. | 364/16.2 |
| 4,456,966 | 6/1984 | Bringol et al. | 340/900 |
| 4,490,783 | 12/1984 | McDonough et al. | 364/200 |
| 4,490,812 | 12/1984 | Guterman | 364/900 |
| 4,517,643 | 5/1985 | Bannai | 364/251.1 |
| 4,542,453 | 9/1985 | Patrick et al. | 364/200 |
| 4,571,677 | 2/1986 | Hirayama et al. | 364/200 |
| 4,610,000 | 9/1986 | Lee | 365/189 |
| 4,620,273 | 10/1986 | Mitani et al. | 364/189 X |
| 4,709,324 | 11/1987 | Kloker et al. | 364/245 |
| 4,727,476 | 2/1988 | Rouchon | 364/200 |
| 4,745,572 | 5/1988 | Wilburn | 364/900 |
| 4,751,703 | 6/1988 | Picon et al. | 371/10 |
| 4,769,767 | 9/1988 | Hilbrink | 364/200 |
| 4,802,119 | 1/1989 | Heene et al. | 364/900 |
| 4,819,154 | 4/1989 | Stiffler et al. | 364/200 |
| 4,831,517 | 5/1989 | Crouse et al. | 364/200 |
| 4,905,200 | 2/1990 | Pidsosny et al. | |
| 4,942,541 | 7/1990 | Hoel et al. | 364/519 |
| 4,972,481 | 11/1990 | Santesson | 380/49 |
| 5,051,897 | 9/1991 | Yamaguchi et al. | 364/245.3 |
| 5,063,499 | 11/1991 | Garber | 395/500 |
| 5,199,032 | 3/1993 | Sparks et al. | 371/3 |
| 5,214,771 | 5/1993 | Clara et al. | 364/200 |
| 5,305,460 | 4/1994 | Kaneko et al. | 395/775 |
| 5,408,672 | 4/1995 | Miyazawa eyt al. | 395/800 |
| 5,454,100 | 9/1995 | Sagane | 395/82.06 |
| 5,619,678 | 4/1997 | Yamamoto | 395/492 |
| 5,623,665 | 4/1997 | Shimada | 395/182.03 |
| 5,731,972 | 3/1998 | Yamamoto | 364/184 |

OTHER PUBLICATIONS

IBM Technical Disclosure Bulletin, vol. 30, No. 5, Oct. 1987, "On–Site–ROS Patch Mechanism."

Patent Abstracts of Japan, vol. 7, No. 67 (P–184), Mar. 19, 1983 & JP–A–57 211 651 (Tokyo Shibaura Denki KK), Dec. 25, 1982.

Patent Abstracts of Japan, vol. 7, No. 90 (P–191), Apr. 14, 1983 & JP–A–58 016 350 (Tokyo Shibaura Denki KK), Jan. 31, 1983.

Patent Abstracts of Japan, vol. 14, No. 64 (P–1002), Feb. 6, 1990 & JP–A–01 286 029 (Sugawa Kazuyuki), Nov. 17, 1989.

ELECTRONIC APPARATUS AND METHOD FOR PATCHING A FIXED INFORMATION

This is a continuation of co-pending application Ser. No. 08/004,932 filed on Jan. 15, 1993.

BACKGROUND OF THE INVENTION

1. Field of the Invention

The present invention relates to an electronic apparatus such as a one-chip microcomputer incorporated within an electronic device, for example.

2. Description of the Related Art

A one-chip microcomputer incorporated within an electronic device, for example, is formed of an electronic apparatus in which a fixed memory means (ROM (read only memory)), a processing means (CPU (central processing unit)), an input means, and a variable memory means (RAM (random access memory)), etc., are unitarily integrated.

In such an electronic apparatus (one-chip microcomputer), a program to be executed by the processing means (CPU) is stored in the fixed memory means (ROM), for example. Such an electronic apparatus can be made inexpensively by means of mass-production.

One-chip microcomputers are incorporated within electronic devices such as consumer VTR's (video tape recorder) having a built-in camera, compact video deck or the like. There is a recent trend that these electronic devices are designed so as to have multiple functions in order to discriminate products. As a result, the amount of information (processing program) stored in the fixed memory means (ROM) is increased and, particularly, the processing program becomes extremely long, which unavoidably causes defects (bugs) to occur.

When such a bug is discovered after the apparatuses have been mass-produced, these already mass-produced apparatuses must be abandoned and the apparatus must be mass-produced again, at great expense. Further, external parts for patching the bug must be mounted on the apparatus. Also, it is frequently observed that external parts cannot be substantially mounted on electronic device because various parts were already mounted on the electronic device with high density.

The assignee of the present application has previously proposed a means for patching a bug after the apparatus was mass-produced (see Japanese Patent Application No. 3-118799). According to this previously-proposed application, in the electronic apparatus, there are provided a patch information memory means for patching a bug and an access switching means. A bug portion is discriminated on the basis of an information stored in a fixed memory means. At that bug portion, the memory access is switched from the fixed memory means to the patch information memory means.

In this previously-proposed apparatus, when an information (processing program) stored in the fixed memory means (ROM) is constantly accessed in a predetermined sequential order, if the next patch portion is designated at the end of the processing where an arbitrary patch portion is patched, then a plurality of bug portions can be patched sequentially.

In this previously-proposed apparatus, however, when other, different information is accessed by an interruption or the like, a bug in such different information cannot be patched. More specifically, when a portion to be patched in the first interrupt processing is designated at the beginning of the interrupt processing, for example, the timing at which this interrupt processing itself is executed in the main processing is not specified and the portion to be patched when the interrupt processing is ended becomes different depending on the timing of the interrupt processing. Consequently, the next portion to be patched cannot be designated.

To solve the above problem, according to the prior art, there are provided a patch information memory means and an access switching means for the interrupt processing independently of those of the main processing, whereby a bug can be patched during the interrupt processing. However, this prior art apparatus needs many additional circuits. Further, when the interrupt processing is executed in a multiple fashion, there are needed a maximum number of sets of patch information memory means and access switching means, which cannot be effected with ease.

OBJECTS AND SUMMARY OF THE INVENTION

Therefore, it is an object of the present invention to provide an improved electronic apparatus in which the aforesaid shortcomings and disadvantages of the prior art can be eliminated.

It is another object of the present invention to provide an electronic apparatus in which a bug discovered after a mass-production can be patched with ease.

It is still another object of the present invention to provide an electronic apparatus in which a bug in an interrupt processing routine can be patched.

According to a first aspect of the present invention, there is provided an electronic apparatus which comprises a fixed memory means in which information is fixedly stored, an address control means for controlling an address, an input means through which an external information is input, a patch information memory means for storing therein a patch information concerning a portion to be changed in the information stored in the fixed memory means, and a switching control means for switching the memory access made by the address control means from the fixed memory means to the patch information memory means. The address control means includes a first memory in which there is saved control data for controlling the switching of memory access by the address control means when an interrupt processing is executed so that the control data for controlling the switching of the memory access during the interrupt processing can be set in the switching control means. The fixed memory means, the address control means, the input means, the patch information memory means and the switching control means are unitarily integrated in the electronic apparatus According to a second aspect of the present invention, there is provided a fixed information patching method for operation of an electronic apparatus which comprises fixed memory means in which an information is fixedly stored, address control means for controlling an address, input means through which an external information is input, patch information memory means for storing therein a patch information concerning a portion to be changed in the information stored in the fixed memory means, and switching control means for switching the memory access made by the address control means from the fixed memory means to the patch information memory means at a predetermined address. This method comprises the steps of saving the control data for controlling the switching of the memory access by the address control means to a first memory during the beginning of an interrupt processing to the address control means, and setting the control data for controlling the switching of the memory access during the interrupt processing in the switching control means. The fixed memory means, the address control means, the input means, the patch information memory means and the switching control means are unitarily integrated in the electronic apparatus.

According to the present invention, the information stored in the fixed memory means is patched by the information from the patch information memory means and an information bug that is discovered after an electronic device is mass-produced can be patched. Also, by saving discriminating data of the patch portion to a stack memory, a bug can be patched during the interrupt processing.

The above and other objects, features, and advantages of the present invention will become apparent from the following detailed description of an illustrative embodiment thereof to be read in conjunction with the accompanying drawings, in which like reference numerals are used to identify the same or similar parts in the several views.

DETAILED DESCRIPTION OF THE PREFERRED EMBODIMENT

The present invention will now be described with reference to the drawings.

Figure 1:
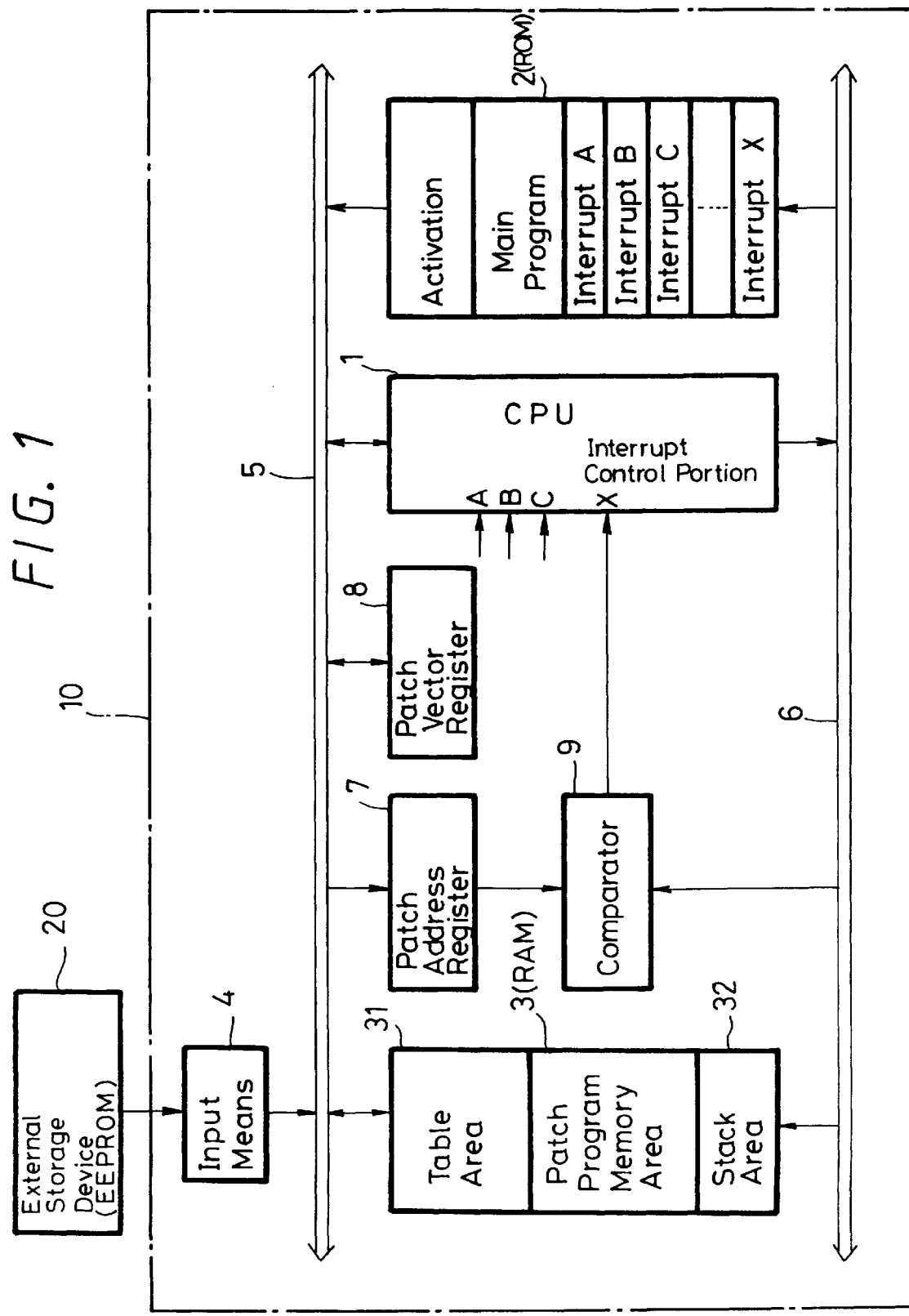
FIG. 1 is a block diagram showing an arrangement of an electronic apparatus according to an embodiment of the present invention.

In FIG. 1 of the accompanying drawings, reference numeral 10 generally designates a one-chip microcomputer serving as an electronic apparatus. The electronic apparatus 10 includes a CPU (central processing unit) 1 serving as a processing means, a ROM (read only memory) 2 serving as a fixed memory means, a RAM (random access memory) 3 serving as a patch information memory means, and an input means 4, e.g. an input/output (I/O) port or the like. The CPU 1, ROM 2, the RAM 3 and the input means 4 are connected to one another via a data bus 5. An address output formed by the CPU 1 is supplied through an address bus 6 to the address inputs of the ROM 2 and the RAM 3.

The electronic apparatus 10 also includes a patch portion address register 7 and a patch interrupt vector register 8 connected to the data bus 5. A comparator 9 detects a coincidence between the address stored in the patch address register 7 and the address on the address bus 6. The comparator 9 is connected at its output portion, from which there is obtained a signal representative of the coincidence of the addresses, to an interrupt control portion X of the CPU 1. The CPU 1 includes also interrupt control portions A, B, C, . . . for other processing.

An external storage device 20 is connected to the input means 4. The external storage device 20 also is incorporated within the electronic device. The external storage device 20 is formed of an EEPROM (electrically erasable and programmable ROM) in which there are generally stored parameters obtained in the adjustment process of electronic device, etc. An information signal from the external storage device 20 is supplied through the input means 4 and then stored in the RAM 4, thereby being utilized in the processing done by the CPU 1.

Figure 2A:
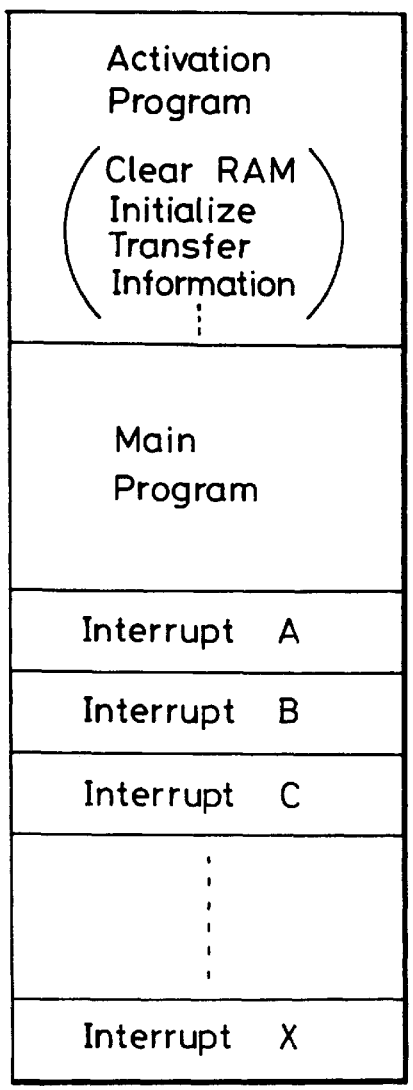
FIGS. 2A and 2B are diagrams used to explain the processing program, respectively.

In the above electronic apparatus 10, a program information for the processing in the CPU 1 is fixedly stored in the ROM 2. In this processing program, there is provided an activation program shown in FIG. 2A, for example. The activation program includes a program for initializing the apparatus such as to clear the RAM 3, and a program for transferring the information from the external storage device 20 through the input means 4 to the RAM 3 or the like.

In the processing program stored in the ROM 2, there is also provided a main program for executing a main processing and interrupt programs for executing a variety of interrupt routines A, B, C, . . . At the beginning of the main program, there is provided a processing program which writes into the registers 7 and 8, respectively, from the fixed table area 31 of the RAM 3, an address of a first bug portion written in the RAM 3 and vector data representative of a starting position of the patch program for patching the first bug portion.

Figure 2B:
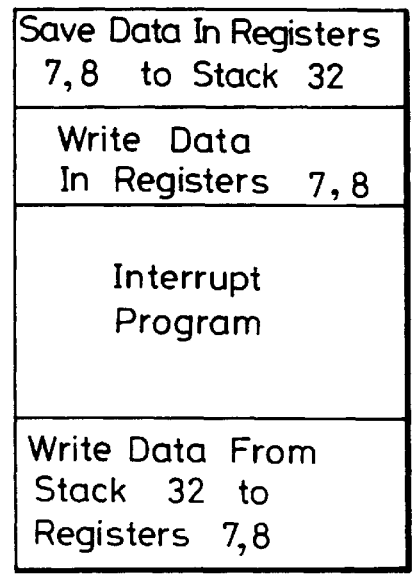

At the beginning of each interrupt program, as shown in FIG. 2B, there is provided processing in which data written in the registers 7 and 8 are saved in the RAM 3 at its stack area 32 which will be described later on. This processing is followed by a processing in which an address of a first patching portion corresponding to the interrupt and vector data representative of a starting position of a patch program for patching the bug portion of the interrupt are written in the registers 7 and 8, respectively. At the end of the interrupt program, there is provided a processing in which the data saved in the stack area 32 is written again in the registers 7 and 8, thus restoring the contents of the registers 7 and 8.

Figure 3:
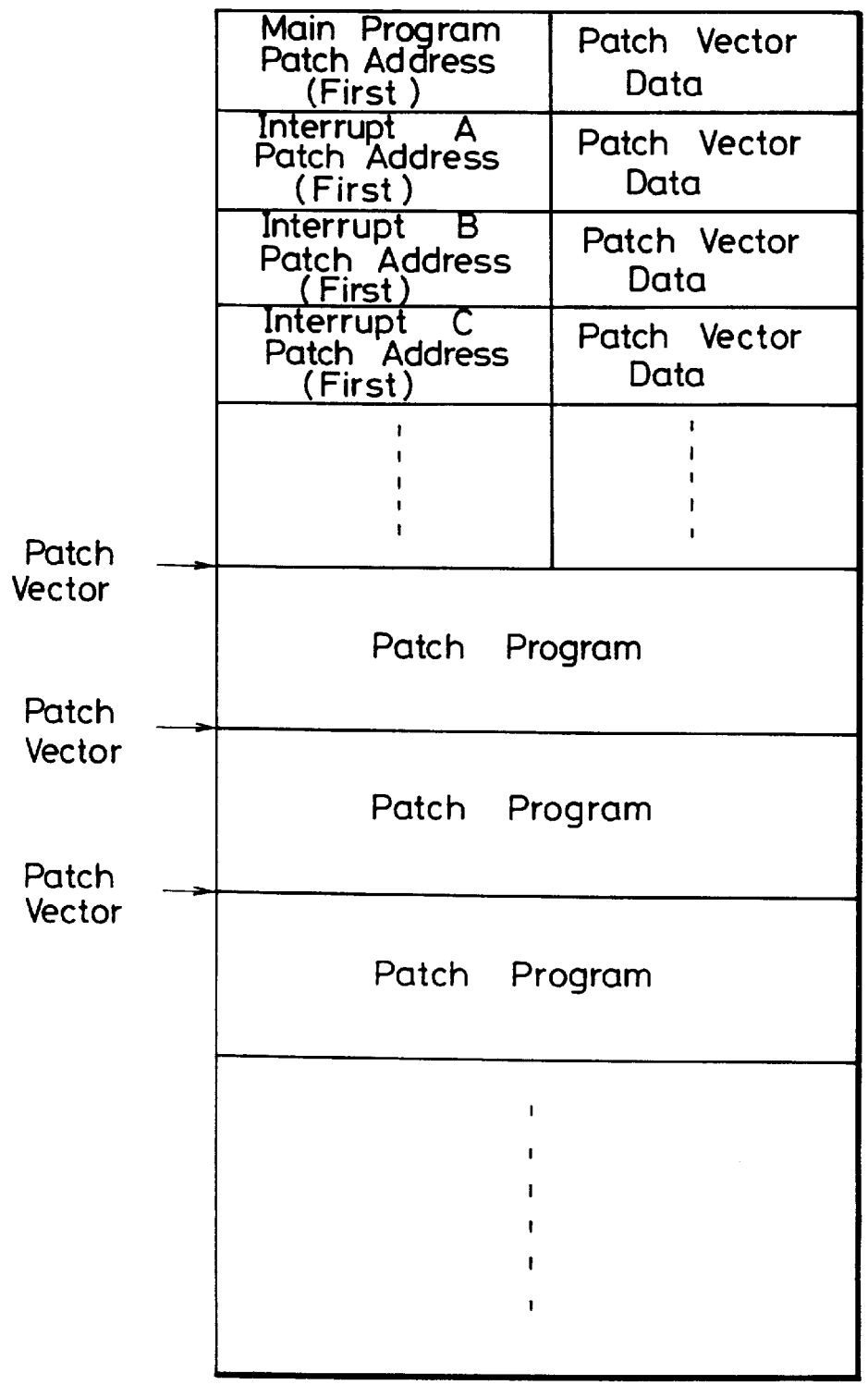
FIG. 3 is a diagram used to explain information that should be patched.

In the external storage device 20, there is stored information used to patch a bug in the information stored in the ROM 2, together with the parameters obtained in the previously described adjustment process. The information used to patch the bug is shown in FIG. 3 and includes an address of a first bug portion corresponding to the main program and the interrupt, vector data representative of a starting position a patch program for patching the first bug portion, and the patch program.

Then, by the processing of the previously described activation program, the information from the external storage device 20 is stored into the RAM 3 through the input means 4. Thus, the patch program is stored in a patch program portion of the RAM 3. However, the main program, the address of the first bug portion corresponding to the interrupt, and vector data representative of the starting position of the patch program for patching the first bug portion are written in the fixed table area 31 of the RAM 3.

Accordingly, in this apparatus, in the beginning of the main program after activation, the address of the first bug portion in the main program and vector data representative of the starting position of the patch program for patching the first bug portion are read out from the fixed table area 31 of the RAM 3 and then written in the registers 7 and 8. Then, when the main program proceeds and the address thereof becomes coincident with the address of the register 7, an interrupt signal is supplied to the interrupt control portion X of the CPU 1.

Thus, data of the register 8 is referred to by the CPU 1 in processing of the interrupt control portion X, and a patch program located at the position indicated by the above data is executed. At the end of this patch program, there are provided an address of the next patch portion of the interrupt program, vector data representative of the starting position of the patch program for patching the address, and a processing by which they are written in the registers 7 and 8, respectively. As described above, the patch portions of the main programs are patched sequentially.

According to the above-mentioned electronic apparatus, when normal interrupt processing is requested to the interrupt control portions A, B, C, etc., the respective interrupt programs Interrupt A, Interrupt B, Interrupt C, etc. are executed. At the beginning of each of these interrupt programs, data written in the registers 7 and 8 are saved to the stack area 32 of the RAM 3. Further, the first patch portion address corresponding to the above interruption and the vector data representative of the starting position of the patch program for patching the address of the patch portion are read out from the fixed table area 31 of the RAM 3 and then written in the registers 7 and 8. As the interrupt program proceeds and the address becomes coincident with the address of the register 7, then a signal is supplied to the interrupt control portion X of the CPU 1.

Thus, the data in the register 8 is referred to by the CPU 1 for the interrupt processing and then the patch program at the position indicated by that data is executed. Further, at the end of this patch program, there are provided an address of the next patch portion in the interrupt program and vector data representative of the starting position of the patch program for patching the address, and address and vector data are written into the registers 7 and 8, respectively. In this way, the patch portions of the interrupt programs are sequentially patched. Furthermore, at the end of each interrupt program, data saved in the stack area 32 are restored to the registers 7 and 8.

Figure 4:
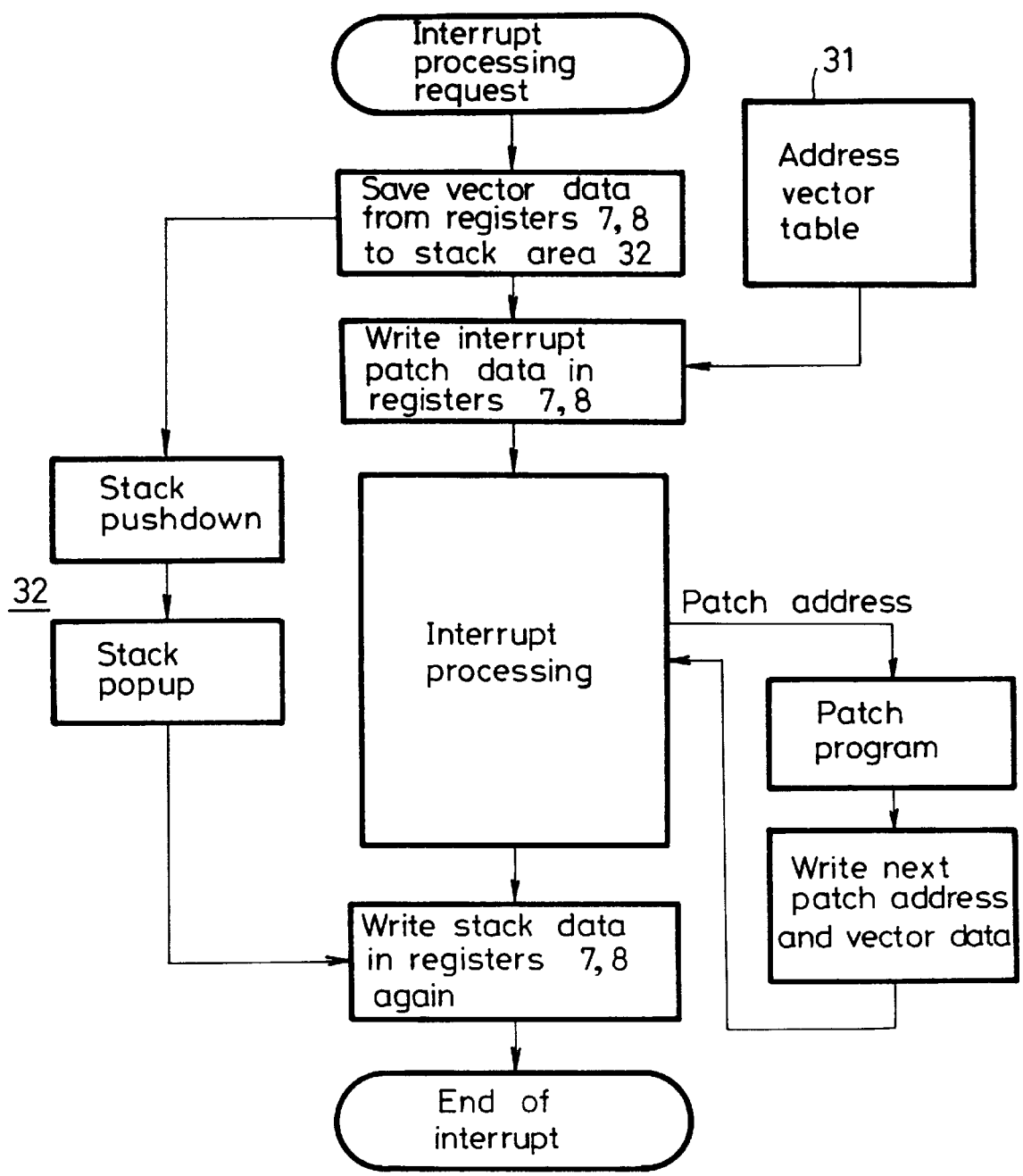
FIG. 4 is a diagram used to explain operation of the present invention.

According to the above-mentioned electronic apparatus, when the interrupt programs are requested in the interrupt control portions A, B, C, etc., as shown in FIG. 4 of the accompanying drawings, the address of the patching portion of the main program and the vector data representative of the starting position of the patch program for patching the address are saved from the registers 7 and 8 to the stack area 32. Then, the address of the first patch portion corresponding to the above interrupt and the vector data representative of the starting position of the patch program for patching the address are read out from the fixed table area 31 of the RAM 3 and written in the registers 7 and 8. Thus, the patch portions of the interrupt programs are patched sequentially. Further, at the end of the interrupt program, the data saved in the stack area 32 are again written in the registers 7 and 8, whereby the patching process of the patch portions in the main program is continuously executed.

As described above, according to the above-mentioned electronic apparatus, the information stored in the fixed memory means (ROM 2) is patched by the information from the patch information memory means (RAM 3) and the information bug that is discovered when the electronic device was mass-produced can be patched. Also, by saving the discriminating data of the patch information to the stack memory (stack area 32), the bugs in interrupt programs can be patched.

Incidentally, in the above electronic apparatus, the stack area 32 may be arranged as a so-called pushdown stack. If so, then the electronic apparatus of the present invention can be applied to multiple interrupts, in which an interrupt program is executed during execution of another interrupt routine.

In accordance with a further embodiment of the invention, the switching means for switching the memory access from the ROM 2 to the RAM 3 is such that the vector data representative of the starting position of the patch program is replaced with a jump command to that position and the output data of the ROM 2 and the data in the register 8 is switched when the addresses compared by the comparator 9 become coincident with each other.

Further, in this further embodiment, address data of the first patch portion corresponding to the interrupt is stored in the fixed table area 31 of the RAM 3 at every processing of the various interrupt programs Interrupt A, Interrupt B, Interrupt C, etc. If there is no bug portion in a particular interrupt program, then corresponding data in the fixed table area 31 must be written in the fixed table area 31 by selecting an address which is not accessed during that particular interrupt program.

In the further embodiment apparatus, after the RAM 3 is cleared by the activation program and all data are cleared to "0", the information from the external storage device 20 is stored. Accordingly, when new data is not written therein, all addresses of the fixed table area 31 of the RAM 3 are all "0". On the other hand, addresses of "0" are assigned to the RAM areas in the CPU 1, this address can be inhibited from being accessed during the program processing. Therefore, if the arbitrary interrupt processing has no bug portion, then the above-mentioned object can be achieved by inhibiting new data from being written in the corresponding fixed table area 31 of the RAM 3.

According to the present invention, the information stored in the fixed memory means is patched by the information from the patch information memory means and the information bug that is discovered after electronic devices were mass-produced can be patched. Also, by saving the discriminating data of the patch portion into the stack memory, a bug in one or more interrupt programs can be patched.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

We claim:

1. An electronic computing apparatus comprising:

(a) a data bus;

(b) an address bus;

(c) a read-only memory connected for providing to the data bus, under control of a read-only memory address on the address bus, an instruction held in the read-only memory at a location designated by the read-only memory address, said read-only memory having a plurality of locations that hold a plurality of program instructions, said plurality of program instructions collectively comprising a program including a plurality of interrupt processing routines;

(d) a processor, connected to said data bus and said address bus, that executes the program instructions;

(e) address control means responsive to the program instructions executed by the processor for providing to the address bus the read-only memory addresses of said plurality of locations holding the program instructions to be executed by the processor;

(f) a patch information memory for holding a plurality of patch instructions representing a plurality of modifications to execution of the program by the processor, said patch information memory connected for providing to the data bus, under control of a patch memory address on the address bus, a patch instruction held in the patch information memory at a location designated by the patch memory address on the address bus;

(g) switching means including a first switching means memory, the switching means for providing to the address bus, under the control of first control data held in the first switching means memory, a patch memory address of a first plurality of patch instructions in said patch information memory in place of a read-only memory address of instructions of a first bug portion of the program, such that the first plurality of patch instructions are provided to the processor for execution in place of the instructions of the first bug portion, whereby said first plurality of patch instructions are executed by the processor in place of the instructions of the first bug portion, said switching means further including (i) a second switching means memory;

(ii) means for moving, during execution of one of said plurality of interrupt processing routines by the processor, the first control data into the second switching means memory, and for thereafter storing second control data into said first switching means memory and such that, during said one of said plurality of interrupt processing routines, the switching means provides to the address bus, under the control of said second control data held in the first switching means memory, a patch memory address of a second plurality of patch instructions in said patch information memory in place of a read-only memory address of instructions of a second bug portion of the program, such that the second plurality of patch instructions are provided to the processor for execution in place of the instructions of the second bug portion, whereby, during said one of said plurality of interrupt processing routines, said second plurality of patch instructions are executed by the processor in place of the instructions of said second bug portion; and (iii) means for restoring, at a termination of execution of said one of said plurality of interrupt processing routines by the processor, the first control data held in the second switching means memory into the first switching means memory wherein said first control data includes a first portion which consists of the read-only memory address of the first bug portion and a second portion which consists of the patch memory address of the first plurality of patch instructions, and wherein the second control data includes a first portion which consists of the read-only memory address of the second bug portion and a second portion which consists of the patch memory address of the second plurality of patch instructions, wherein said switching means further includes comparing means for comparing an address on the address bus with the first portion of whichever of said first and second control data is in the first switching means memory; and interrupt signal generating means for generating an interrupt to said processor to cause said processor to execute a patch processing interrupt routine wherein said patch processing interrupt routine is one of said plurality of interrupt processing routines and execution of the patch processing interrupt routine causes said switching means to provide to the address bus the second portion of whichever of said first and second control data is in the first switching means memory.

\* \* \* \* \*